United States Patent [19]
Brosowske et al.

[11] Patent Number: 5,272,937
[45] Date of Patent: Dec. 28, 1993

[54] ACTIVE INERTIA TORQUE ABSORBING SYSTEM

[75] Inventors: Thomas A. Brosowske, Peoria; Geoffrey M. Turk, Stanford; Jose M. Salazar-Vior, Washington; Michael J. Smith, Dunlap; Robert C. Heitzman, Washington; Nelson A. Jones, Peoria; Samuel M. Bishop, Chillicothe, all of Ill.

[73] Assignee: Caterpillar Inc., Peoria, Ill.

[21] Appl. No.: 888,076

[22] Filed: May 26, 1992

[51] Int. Cl.⁵ ............................................. F16H 3/44
[52] U.S. Cl. ................................... 74/573 R; 74/574; 123/90.31
[58] Field of Search ............... 74/437, 440, 573 R, 74/574; 123/90.31

[56] References Cited

U.S. PATENT DOCUMENTS

| | | | |
|---|---|---|---|
| 4,117,742 | 10/1978 | Stein | 74/573 R |
| 4,836,156 | 6/1989 | Inagaki et al. | 123/90.31 |
| 4,854,274 | 8/1989 | Dingess | 74/574 X |
| 5,017,178 | 5/1991 | Krikke et al. | 464/7 |
| 5,040,500 | 8/1991 | Reese | 123/90.31 X |
| 5,172,662 | 12/1992 | Hampton | 123/90.31 X |
| 5,179,918 | 1/1993 | Gyurovits | 123/90.31 X |
| 5,181,486 | 1/1993 | Gyurovits | 123/90.31 X |

OTHER PUBLICATIONS

Publication entitled Practical Solutions of Torsional Vibration Problems vol. 4, Devices For Controlling Vibration by W. Ker Wilson.

Primary Examiner—Leslie A. Braun
Assistant Examiner—Ryan W. Massey
Attorney, Agent, or Firm—Diana L. Charlton

[57] ABSTRACT

A camshaft in an internal combustion engine encounters various torques during operation which produce torsional vibrations leading to excessive noise and reduced gear life. An active inertia absorbing system includes a camshaft gear integrally formed with a carrier. The carrier has a plurality of bores having a predetermined diameter. A plurality of weights are positioned within the bores and have a predetermined diameter less than the predetermined diameter of the bores so that the weights are free to move within the bores. The mass of the carrier and the weights establish an inertia which acts in opposition to the torques applied to the camshaft for absorbing the torsional vibrations of a camshaft.

2 Claims, 3 Drawing Sheets

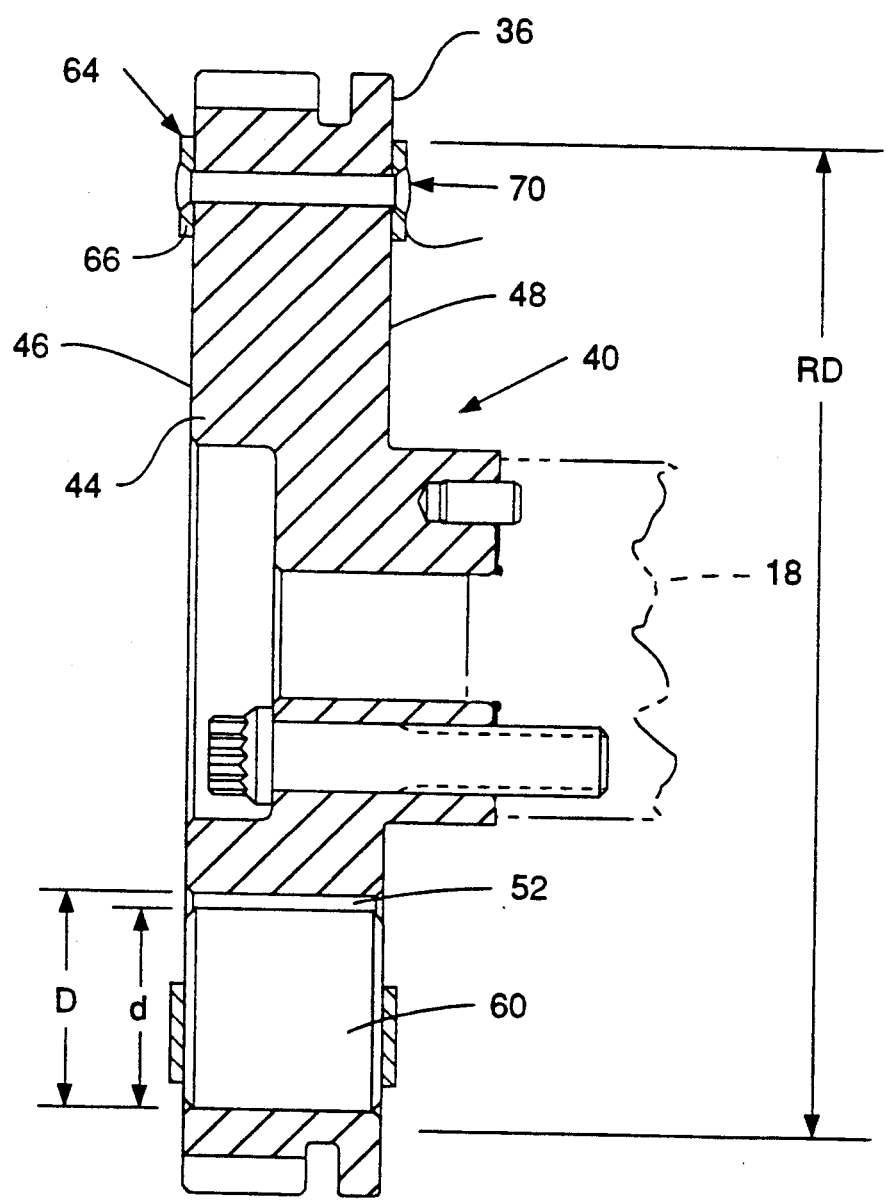

ACTIVE INERTIA TORQUE ABSORBING SYSTEM

TECHNICAL FIELD

This invention relates to dampening systems for internal combustion engines and more particularly to an active inertia torque absorbing system for a camshaft.

BACKGROUND ART

Torsional vibrations resulting from speed oscillations in an internal combustion engine are common and lead to excessive noise and reduced gear life, which in turn, may cause premature engine failure. The oscillations are produced by various torques applied to components within the engine, such as a crankshaft or camshaft, during normal operation of the engine. For example, the torque applied to the camshaft is constantly varied from a high torque when the springs of the intake and exhaust valves and the unit injectors are being compressed to a low torque when the springs of the valves and unit injectors are expanded. The high torque applied to the camshaft causes the camshaft to twist until the valves and injectors are totally compressed. Shortly after the valves and injectors have reached the maximum compressive state, the camshaft instantaneously backlashes due to relinquishing the forces stored during twisting. The wide range of torques applied to the camshaft induce oscillations resulting in increased dynamic loading on the gear train, increased torsional vibrations, excessive noise, and reduced gear life.

It is known in the art that crankshaft vibration can be reduced by increasing the flywheel inertia, increasing the compliance of the driveline, or adding dissipative devices in the driveline. For example, rotating pendulum vibration absorbers have been used which include a carrier mounted to the crankshaft. The carrier has bores that contain cylindrical rollers that are retained within the bores yet are free to move within the bores. As the crankshaft and carrier rotate the rollers are subject to centrifugal forces which attempt to position the rollers at the outer radius of the carrier bores. As speed increases, the centrifugal force increases resulting in a natural frequency of the roller within the carrier that changes in direct proportion to the speed. This allows the pendulum absorbers to be tuned for a given multiple of the crankshaft speed and the ability to maintain this effective tuning throughout the engine's speed range. Any oscillations occurring at this multiple of engine speed cause the rollers to oscillate in their bores which in turn creates a torque which opposes the original oscillations and thereby reduces crankshaft vibration.

It is also known that camshaft vibration can be reduced by using rubber or spring devices. U.S. Pat. No. 5,017,178 issued to Roger D. Krikke, et al. discloses a coupling apparatus for resiliently transmitting torque including a pin assembly positioned in mechanical connection between an annular plate member and a gear member. The apparatus also dampens backlash motion by utilizing the pin assembly and a mechanism for biasing a piston into contact with the annular plate member. The coupling apparatus actually isolates the torsional vibrations of the camshaft from the camshaft gear in order to protect the gear train from excessive loading but does not seek to resolve the torsional vibrations of the camshaft. In addition, the coupling apparatus requires extensive machining making the apparatus uneconomical to produce in large quantities.

The art as cited above does not recognize a further problem in that the recent development of camshaft actuated high pressure unit injectors has drastically increased the torques applied to the camshaft. This problem is further magnified by the non-linear dynamic behavior of gear trains which by common design practice contain zones of relative motion without any torque transmittal. The highly varied applied camshaft torques can be significantly increased due to the impactive type loading on the gears and bearings within the gear train during reversals in motion. Additionally, as engine emission laws become more stringent, the need to maintain the proper timing of the valving and injector events relative to the crankshaft and piston position becomes more critical. The trend toward producing the high pressure unit injector engines makes it increasingly necessary to produce an economical method to reduce camshaft vibration.

The present invention is directed to overcoming one or more of the problems as set forth above.

DISCLOSURE OF THE INVENTION

The present invention provides an active inertia torque absorbing system adapted for use in an internal combustion engine having a cylinder block rotatably mounting a crankshaft. A cylinder head is connected to the cylinder block and a camshaft subjected to periodic vibrations is rotatably supported by one of the cylinder head and cylinder block. A gear train has a plurality of gears for driving the camshaft from the crankshaft. The active inertia torque absorbing system includes a camshaft gear releasably mounted to the camshaft and being one of the gears of the gear train. A carrier is rigidly connected to the camshaft gear for conjoint rotation therewith. A means is provided for establishing an active inertia operatively associated with the carrier for absorbing the vibration of the camshaft.

The present invention substantially reduces the vibration of the camshaft in a simple economical design which includes a carrier rigidly connected to the camshaft gear for conjoint rotation therewith and a means for establishing an active inertia operatively associated with the carrier. The reduction of camshaft vibration reduces noise, increases gear life, and improves timing and injection performance.

BRIEF DESCRIPTION OF THE DRAWINGS

FIG. 3 is a sectional view taken along line 3—3 of FIG. 2.

BEST MODE FOR CARRYING OUT THE INVENTION

Figure 1:
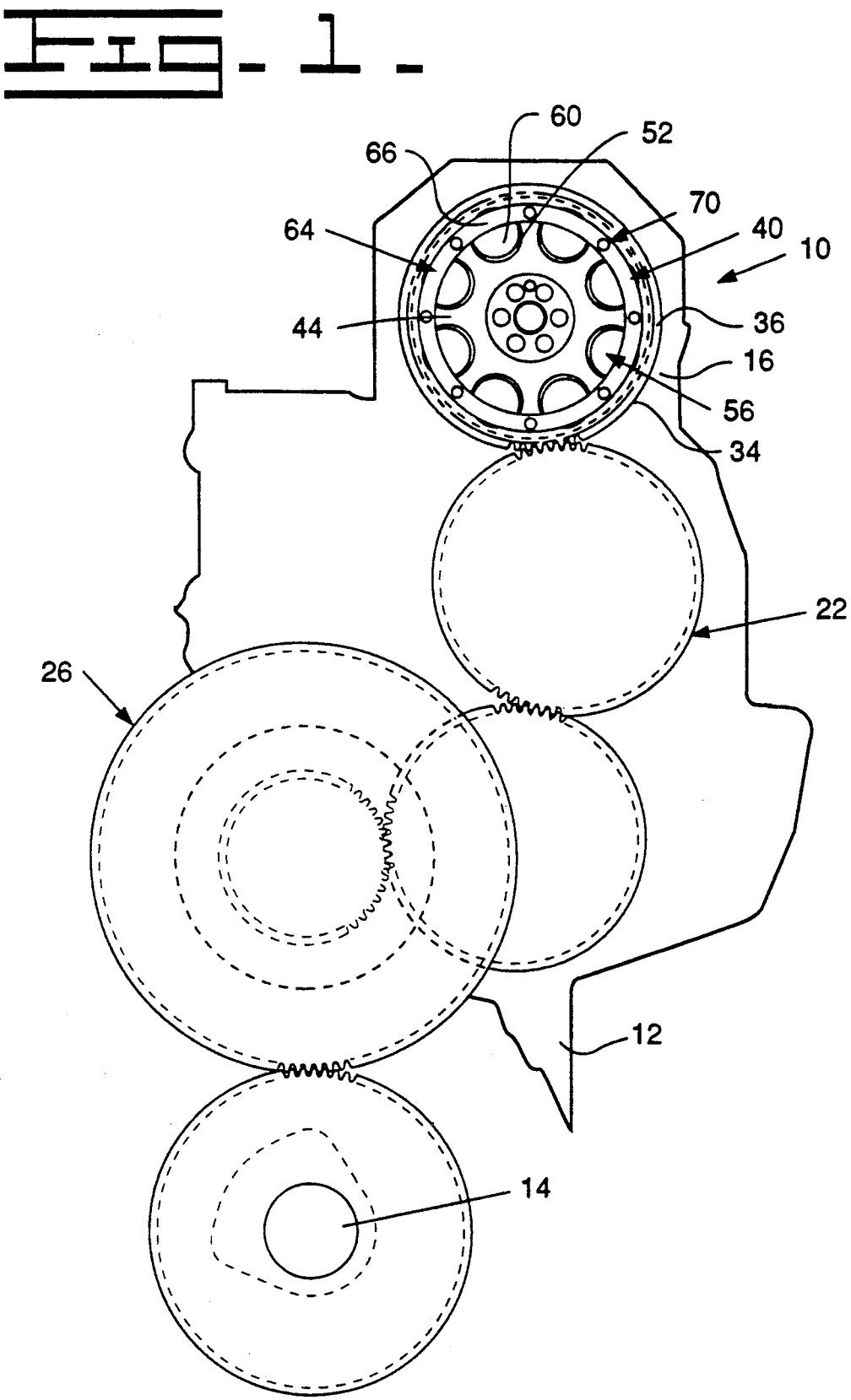
FIG. 1 is a partial end view of an internal combustion engine having a gear train with an active inertia system according to the present invention.

An internal combustion engine of the in-line type is illustrated at 10 having a cylinder block 12 rotatably mounting a crankshaft 14. A removably connected cylinder head 16 is mounted on the cylinder block 12 in a conventional manner. An overhead camshaft 18, shown in FIG. 3, is rotatably mounted within the cylinder head 16 and is used to actuate a plurality of intake and exhaust valves (not shown) and a plurality of unit injectors (not shown) which, in part, subjects the camshaft 18 to periodic vibrations. A gear train 22 drives the camshaft 18 from the crankshaft 14. The gear train 22 has a plurality of gears 26 meshingly interconnected. A camshaft gear 34 releasably secured on the camshaft 18 for rotation therewith is one of the gears 26 of the gear train 22 and has an outer periphery 36.

Figure 2:
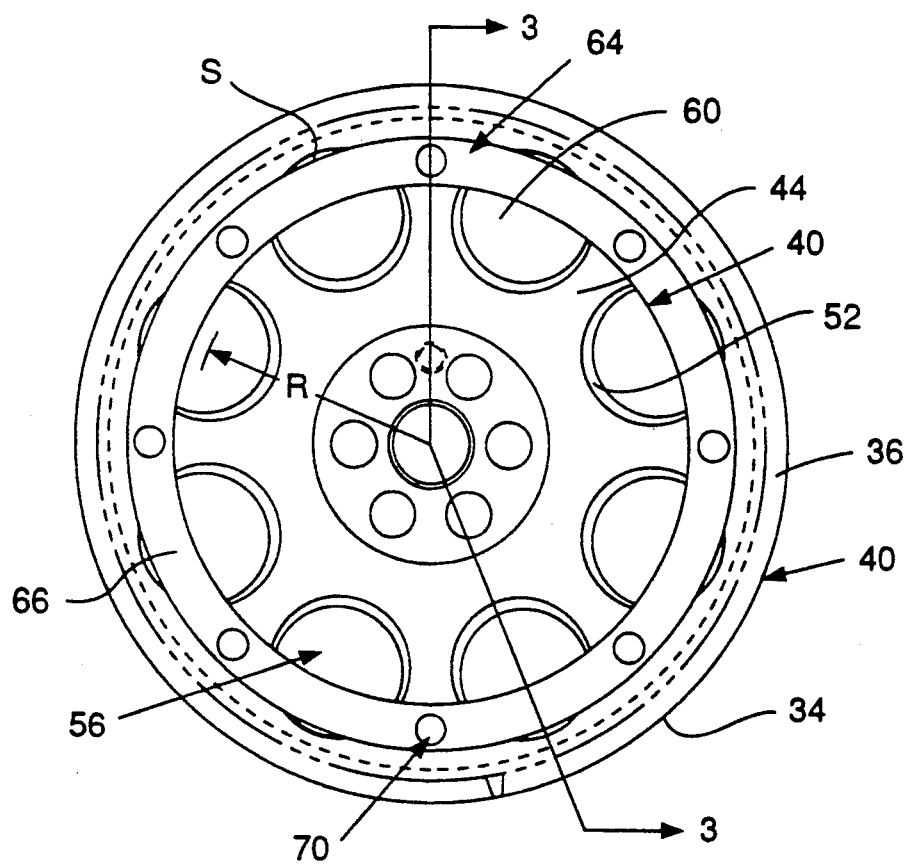
FIG. 2 is an enlarged view of a portion of FIG. 1 showing the active inertia system.

The camshaft gear 34 defines an active inertia torque absorbing system 40, shown in FIGS. 1-3, including a carrier 44 having two opposing sides 46,48. The carrier 44 also includes a plurality of circumferentially spaced bores 52 extending through the carrier 44 with each bore 52 having a predetermined diameter D. The bores 52 are disposed at a predetermined radius R from the center of the carrier 44. The carrier 44 has a predetermined weight and is rigidly connected to and formed integrally with the camshaft gear 34 for conjoint rotation therewith and is positioned inwardly from the outer periphery 36 of the camshaft gear 34. The active inertia torque absorbing system 40 also includes a means 56 for establishing an active inertia operatively associated with the carrier 4 for absorbing the vibration of the camshaft 18. The establishing means 56 includes a plurality of cylindrical weights 60 positioned within the bores 52. The weights 60 each have a predetermined diameter d less than the predetermined diameter D of the bores 52 and have a predetermined mass. The active inertia torque absorbing system 40 includes a means 64 for holding the weights 60 within the bores 52 yet allowing the weights 60 to move freely within the bores 52. The holding means 64 includes a pair of rings 66,67 connected to the opposing sides 46,48 of the carrier 44 by a plurality of fasteners 70, such as rivets. The pair of rings 66,67 are positioned to partially cover the bores 52 and each has a predetermined diameter RD which produces a crescent shaped space S adjacent the outer periphery 36 of the camshaft gear 34 when fastened to the opposing sides 46,48.

Alternatively, it should be noted that the carrier 44 and the camshaft gear 34 could be separately secured on the camshaft 34 as non-integral parts.

INDUSTRIAL APPLICABILITY

Proper tuning of the active inertia torque absorbing system 40 depends on the proper relationship of the diameters of the weights 60, the diameter of the bores 52, and the radial position of the bores 52 to the center of rotation of the carrier 44. The resistive torque produced by the active inertia torque absorbing system 40 is a function of the number of cylindrical weights 60, mass of the weights 60, radius from the centerline of the carrier 44 to the center of the bores 52, and the camshaft 18 speed.

In operation, the weights 60 within the plurality of bores 52 are responsive to any speed oscillations occurring at the tuned multiple of the engine speed as determined by the geometry stated above. When the camshaft 18 drives the unit injectors and valves of the engine, the load torques will be dominated by the number of injectors or valves driven times the camshaft 18 speed and the harmonics of this frequency. As these oscillating loads attempt to slow down and speed up the camshaft 18, camshaft gear 34, and the active inertia torque absorbing system 40, the weights 60 will begin oscillating within the bores 52 in a pendulum type motion at the same frequency as the applied oscillating loads. The motion of the weights 60 and their mass acting together on the same carrier 44 produce a torque component acting tangentially on the carrier 44. This torque will be in opposition to the original applied torque which induces the initial oscillation of the camshaft 18. The motion of the weights 60 will increase with any increase in the original applied torque establishing a motion level which provides a resulting resistive torque substantially equal to the original applied torque, thereby, reducing the overall torsional vibrations of the camshaft 18.

In the gear train 22, camshaft load torques increase the dynamic loading on the gears 26 forcing the gears 26 in both the driving direction as well as the reverse direction. The active inertia torque absorbing system 40 provides torque input acting in opposition to the applied load torques thus preventing the camshaft 18 vibrations from becoming so extreme as to load the gear train 22 in both directions. The ability of controlling the dynamic behavior of the gear train 22 allows the added inertia of the carrier 44 itself to also be beneficial in reducing camshaft vibrations. The reduced vibrations of the camshaft 18 produce benefits not only in component loading and noise reductions, but also in more consistent unit injection performance and more controlled crankshaft 14 to camshaft 18 timing relationships.

The retaining rings 66,67 permit lubricating fluid to enter the plurality of bores 52 at uncovered portions near the center of the carrier 44. The fluid lubricates the weights 60 and bores 52 and then exits the carrier 44 by flowing out through the crescent shaped space S. The ability of the fluid to enter and exit the bores 52 provides sufficient lubrication without trapping any debris or producing excessive damping effects on the beneficial motion of the weights 60.

In view of the above, it is apparent that the present invention provides an improved means to reduce torsional vibrations associated with a camshaft. This is accomplished by utilization of a active inertia torque absorbing system including a camshaft gear and a carrier formed integrally with the camshaft gear for conjoint rotation therewith. The carrier has a plurality of bores wherein a plurality of weights are positioned. The weights are free to oscillate in the bore so that they create a torque which opposes the torque produced oscillations of the camshaft to reduce torsional vibrations of the camshaft.

Other aspects, objects, and advantages of this invention can be obtained from a study of the illustrations, the disclosure, and the appended claims.

We claim:

1. An active inertia absorbing system disposed in an internal combustion engine having a cylinder block rotatably mounting a crankshaft, a cylinder head connected to the cylinder block and subjected to periodic vibrations, and a gear train having a plurality of gears for driving the camshaft from the crankshaft, comprising:

a camshaft gear releasably mounted to the camshaft and being one of the gears of the gear train, the camshaft gear having an outer periphery;

a carrier rigidly connected to the camshaft gear for conjoint rotation therewith, the carrier having two opposing sides and a plurality of bores extending through the carrier with each of the bores having a predetermined diameter;

means for establishing an active inertia operatively associated with the carrier for absorbing the vibration of the camshaft, the establishing means including a plurality of cylindrical weights positioned within the bores with the weights each having a predetermined diameter less than the predetermined diameter of the bores; and means for holding the weights within the bores, the holding means including a pair of rings connected to the opposing sides of the carrier by a plurality of fasteners so that a crescent shaped space is formed adjacent the outer periphery of the camshaft gear.

2. The active inertia absorbing system of claim 1, wherein the carrier is formed integrally with the camshaft gear.

* * * * *